United States Patent
Yan et al.

(10) Patent No.: US 10,234,479 B2
(45) Date of Patent: Mar. 19, 2019

(54) RESONANCE SUPPRESSION STRUCTURE OF A WIDEBAND NEAR-FIELD MAGNETIC PROBE AND A CONSTRUCTION METHOD THEREOF

(71) Applicant: BEIHANG UNIVERSITY, Beijing (CN)

(72) Inventors: Zhaowen Yan, Beijing (CN); Jianwei Wang, Beijing (CN); Wei Zhang, Beijing (CN); Donglin Su, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/482,734

(22) Filed: Apr. 8, 2017

(65) Prior Publication Data
US 2017/0212146 A1 Jul. 27, 2017

(30) Foreign Application Priority Data
Apr. 8, 2016 (CN) .......................... 2016 1 0214915

(51) Int. Cl.
*G01Q 60/54* (2010.01)
(52) U.S. Cl.
CPC .................... *G01Q 60/54* (2013.01)
(58) Field of Classification Search
CPC ........ G01Q 60/50; G01Q 60/52; G01Q 60/54; G01Q 60/56; G01Q 70/00; G01Q 70/06; G01Q 70/08; G01Q 70/10; G01Q 70/14; G01Q 70/16; G01Q 70/18
USPC ........ 850/25, 33, 34, 35, 36, 37, 38, 39, 40, 850/41, 46, 48, 49, 52, 55, 56, 57, 59, 60, 850/61
See application file for complete search history.

(56) References Cited

U.S. PATENT DOCUMENTS

2012/0279287 A1* 11/2012 Andry ...................... G01B 5/28
73/105

* cited by examiner

*Primary Examiner* — Jason L McCormack (57) ABSTRACT

The resonance structure is that two rows of ground via holes are placed symmetrically along two sides of the CB-CPW central conductor; each row of the via holes are equally spaced; every via hole connects a top shield plane layer, a first middle layer and a bottom shield plane layer of the magnetic probe; every via hole is placed out of a rectangle gap at the bottom of the magnetic probe; the via holes form a fence. The construction method: 1. constructing a simulation model formed by the magnetic probe and a 50Ω microstrip in a CST® microwave studio; 2. simulation setting; 3. placing via holes along two sides of the central conductor; 4. connecting a 50Ω matching load to the second end of the microstrip and defining the first end as microstrip port1; defining the end on which mount a SMA connector as probe port2; simulating S21.

3 Claims, 7 Drawing Sheets

RESONANCE SUPPRESSION STRUCTURE OF A WIDEBAND NEAR-FIELD MAGNETIC PROBE AND A CONSTRUCTION METHOD THEREOF

CROSS REFERENCE OF RELATED APPLICATION

This application claims priority under 35 U.S.C. 119(a-d) to CN 201610214915.1, filed Apr. 8, 2016.

BACKGROUND OF THE PRESENT INVENTION

Field of Invention

The present invention relates to a resonance suppression structure of a wideband near-field magnetic probe and a construction method thereof, and more particularly to electromagnetic leak and electromagnetic near-field test field.

Description of Related Arts

CB-CPW (Conductor-backed coplanar waveguide) is able to connect with other microwave components conveniently to achieve miniature microwave circuit and improve the integration density. Meanwhile, the dispersion of the CB-CPW is small, which is applicable to the wideband microwave circuit. The CB-CPW is widely adopted. The conventional design of CB-CPW incents the harmful parallel-plate mode and cause CB-CPW resonance.

When CB-CPW is included in the magnetic probe structure, a CB-CPW resonance is an important factor in the magnetic probe resonance. Meanwhile, dealing the magnetic probe resonance is important for achieving a magnetic probe wideband performance. The present invention designs a simple and convenient method to suppress the high-frequency resonance of the magnetic test probe.

SUMMARY OF THE PRESENT INVENTION

1. An Object of the Present Invention:

Near-field scanning is an important way to solve electromagnetic interference and electromagnetic compatibility. The magnetic probe is the key component for the near-field scanning. The bandwidth of the electromagnetic spectrum is wide, which requires the magnetic probe in the test to meet wideband test requirements. Solving the problem of magnetic probe resonance within the test frequency band is important for carrying out wideband test. The magnetic probe adopts CB-CPW (Conductor-backed coplanar waveguide) as a feeder. The CB-CPW central conductor couples the energy to the top shield plane layer at high frequency. The whole top and bottom layer of the near-field magnetic test probe are metal layers. The near-field magnetic test probe is able to be treated as a metal resonant cavity to make resonance occurs while the magnetic test probe is at high frequency. For solving the CB-CPW resonance, the present invention publishes a resonance suppression structure of a wideband near-field magnetic probe and a construction method thereof to improve the performance of the magnetic probe and extend the working band of the magnetic probe.

2. Technical Solution:

In order to fulfill the object of the present invention, a method of transferring the resonance within the working band of the magnetic probe outside of the working band is adopted. From the angle of solving the CB-CPW resonance, the present invention analyzes the theoretical basis of the CB-CPW resonance, proposes the resonance suppression structure of the magnetic test probe and publishes a construction and design method for the suppression structure.

The resonance suppression structure of the wideband near-field magnetic probe in the present invention is based on the wideband near-field magnetic probe, the structure of which comprises:

a micro coaxial connector and magnetic probe body;

wherein the micro coaxial connector is a SMA (SubMiniature version A) connector; the SMA connector is the Super SMA made by the Southwest Microwave, Inc. USA; the model number is 292-04A-6;

the design and produce of the magnetic probe body is based on 4-layer PCB (printed circuit board) craft; the magnetic probe body comprises a top shield plane layer, a bottom shield plane layer, a first middle layer, a stripline of a second middle layer, a signal via hole, shorting via holes, a coaxial via-hole array around the signal via hole, a CB-CPW central conductor and fence via-hole arrays along the two sides of the CB-CPW central conductor;

wherein the magnetic probe body is in a T-shape, wherein a narrow end of the T-shape is a top and a wide end is a bottom; the top is for magnetic signals detection and the bottom is for handheld and mounting of the SMA connector; the T-shape structure reduces the size of the magnetic probe body under the condition that the SMA connector is able to be fixed and installed conveniently;

wherein on a top of the top shield plane layer there is a T-shape gap; on a bottom of the top shield plane layer there is a rectangle gap; the T-shape gap prevents a shielding of the magnetic signals by the top shield plane layer; the rectangle gap prevents a connection between the top shield plane layer and the CB-CPW central conductor while top layer wiring;

wherein on a top of the bottom shield layer there is a T-shape gap of a same size as the T-shape gap at the top of the top shield layer to prevent a shielding of the magnetic signals by the bottom shield layer; no opening is on the bottom of the magnetic probe;

wherein a size of the T-shape gap decides a sensitivity and a spatial resolution of the magnetic probe;

wherein the stripline of the second middle layer is in a L-shape; a first end of the stripline is connected with the top shield plane layer and the bottom shield plane layer through the shorting via holes at the T-shape gap; the stripline, the T-shape gap on the top shield plane layer and the T-shape gap on the bottom shield plane layer form an internal ring to receive the magnetic signals from outside; the internal ring is wrapped by the top shield plane layer and the bottom shield plane layer, which is able to effectively suppress the electric field signal coupling, reduce electric field signal received by the internal ring and increase the magnetic probe sensitivity to the magnetic signal;

wherein the CB-CPW central conductor is inside the rectangle gap on the top shield plane layer; the top shield plane layer is treated as a ground plane of the CB-CPW; the first middle layer is treated as a back metal panel of the CB-CPW; the CB-CPW central conductor is treated as a feeder, a second end of which is connected with the SMA connector and a first end is connected with a second end of the stripling through the signal via hole; the ground via holes symmetrically distributed along the two sides of the CB-CPW central conductor connect the top shield plane layer and the bottom shield plane layer to form the fence via-hole arrays and suppress the resonance of the magnetic probe;

wherein the ground via holes around the signal via hole connect the top shield plane layer and the bottom shield plane layer; distances between each of the ground via holes and the signal via hole are equal, which are 0.9-1.3 mm, to form a coaxial via-hole array and realize a wideband impedance matching of the magnetic probe;

wherein a length of the CB-CPW central conductor is 5-8 mm; a diameter of the signal via hole is 0.2-0.3 mm; horizontal distances from the signal via hole to edges of two sides of the magnetic probe are equal;

wherein a diameter of the ground via holes is 0.2 mm-0.3 mm;

a diameter of the shorting via holes is 0.2 mm-0.3 mm;

the wideband is 300 kHz-20 GHz;

a size of the magnetic probe is Φ50 mm×10 mm–Φ90 mm×20 mm.

For a better understanding of the present invention, the theoretical basis of the CB-CPW resonance is explained as follow:

In the microwave and electromagnetic theory, when the working frequency of the CB-CPW is compared with the physical size of the CB-CPW the two ground planes are treated as two pieces of antenna. The CB-CPW central conductor is treated as the feeder of each piece of the antenna. The energy is coupled onto each piece of the antenna through the central conductor. The CB-CPW not only has dominant-mode transmission but also has parallel-plate mode. The energy leak caused by the back metal panel of the CB-CPW transmits energy to the parallel-plate mode in low frequency and incents the parallel-plate mode.

The ground plane and the back metal panel form the resonant cavity. The resonant frequency is calculated with the below formula:

$$f_{mn} = 0.5c \sqrt{\frac{1}{\varepsilon_r}\left[\left(\frac{m}{w}\right)^2 + \left(\frac{n}{l}\right)^2\right]}$$

In the formula, w, l are the width and length of each ground plane of the CP-CPW respectively; c denotes the light velocity; $\varepsilon_r$ denotes the relative permittivity of the medium; m and n are the resonant mode number (m, n are not able to be 0 at the same time).

A detailed description of the resonance suppression structure of the wideband near-field magnetic probe of the present invention is as follow:

Two rows of ground via holes are placed symmetrically along two sides of the CB-CPW (conductor-backed coplanar waveguide) central conductor; each of the two rows of the ground via holes are equally spaced; each of the ground via holes connects the top shield plane layer of the magnetic probe, the first middle layer of the magnetic probe and the bottom shield plane layer of the magnetic probe; each of the ground via holes is placed out of a rectangle gap at a bottom of the magnetic probe; the ground via holes surround the CB-CPW central conductor in a middle and form a fence along the two sides of the CB-CPW central conductor; the ground via holes construct fence via-hole arrays which provides a signal return path; the ground via holes suppresses a power transmission from a CB-CPW to a parallel-plate-mode, which prevents the parallel-plate-mode incented by the CB-CPW in a working band to move a resonance frequency out of the wording band and improves the working band.

A construction method of the resonance suppression structure of the wideband near-field magnetic probe of the present invention comprises the following steps:

step 1: constructing a simulation model formed by a magnetic probe and a 50Ω microstrip in a CST® microwave studio, wherein a size of the microstrip substrate is 80 mm×50 mm×1.6 mm; the substrate is made of Rogers4350B; a characteristic resistance of the microstrip is 50Ω;

step 2: simulation setting of the CST® microwave studio, wherein comprises a simulation background setting, a simulation algorithm setting, a simulation frequency setting and a boundary condition setting;

step 3: placing ground via holes along two sides of a CB-CPW central conductor at a bottom of the magnetic probe, wherein a radius of the ground via holes is 0.125 mm which is the minimum processing radius of a machine drill; placing seven ground via holes in each row according to a specific size of the magnetic probe;

step 4: connecting a 50Ω matching load to a second end of the constructed microstrip and defining a first end as microstrip port1; defining a end of the magnetic probe on which mount a SMA connector as probe port2; simulating S21 (the transmission coefficient from microstrip port1 to the magnetic probe SMA connector) parameter; observing S21 while every simulation; wherein if resonance occurs within the simulation frequency band of S21 adjusting a number of and a distance between the ground via holes along the two sides of the CB-CPW central conductor until the S21 parameter of the magnetic probe reaches a tolerance level;

The benefits of the present invention: the present invention proposes a magnetic probe fence via-hole array resonance suppression structure, wherein the ground via holes are placed symmetrically along the two sides of the CB-CPW central conductor without changing the physical size of the CB-CPW (the length and width of the central conductor; the length and width of the ground plane; the length and width of the back metal panel) to effectively suppress the CB-CPW parallel-plate mode, reduce the resonance within the working band and extend the working band of the magnetic probe.

The structure of the present invention is simple. While designing the magnetic probe, only the ground via holes need to be added, which does not increase the complexity of the magnetic probe structure and design procedure. The present invention is able to be easily grasped by the engineer and technician. To add the via holes barely increases the design and processing cost of the magnetic probe. The present invention has the advantages of low cost, easy promotion and production.

Elements number: 1—ground via holes, 2—CB-CPW, 21—fence via-hole arrays, 22—coaxial via-hole array, 23—shorting via hole, 3—CB-CPW central conductor, 4—CB-CPW back metal panel, 31—top shield plane layer of a magnetic probe, 32—first middle layer of a magnetic probe, 33—microstrip of a magnetic probe, 34—bottom shield plane layer of a magnetic probe, 35—CB-CPW central conductor of a magnetic probe, 36—rectangle gap on the top layer, 5—signal via hole, 41—T-shape gap on the top layer, 42—T-shape gap on the bottom layer, 6—microstrip, 7—SMA connector, 8—magnetic probe body.

Symbols in the Graph:
l: a length of the CB-CPW ground plane;
w: a width of the CB-CPW ground plane;
s: a width of the CB-CPW central conductor;
d: a closest distance between the edge of the CB-CPW central conductor and the edge of CB-CPW ground plane;
h: a thickness of the CB-CPW medium;
G: a nearest distance from the ground via hole to the edge of the CB-CPW central conductor;
D: a space between the ground via holes.

DETAILED DESCRIPTION OF THE PREFERRED EMBODIMENT

Referring to the drawings, a resonance suppression structure of the magnetic probe and the construction method thereof are further explained. A simulation design idea and process is published and the simulation result is announced.

Figure 1:
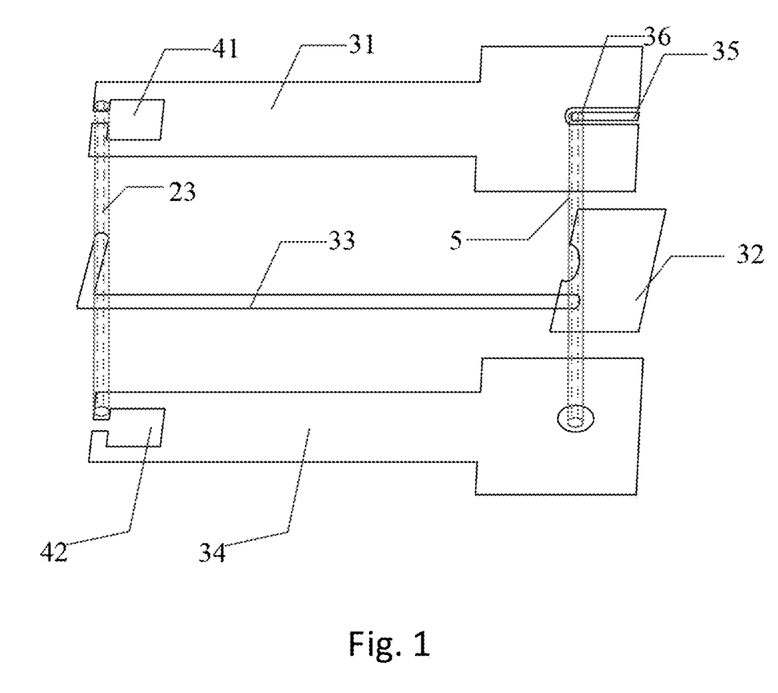
FIG. 1 is a 3-dimensional structure exploded view of a wideband near-field magnetic probe body.
Figure 2:
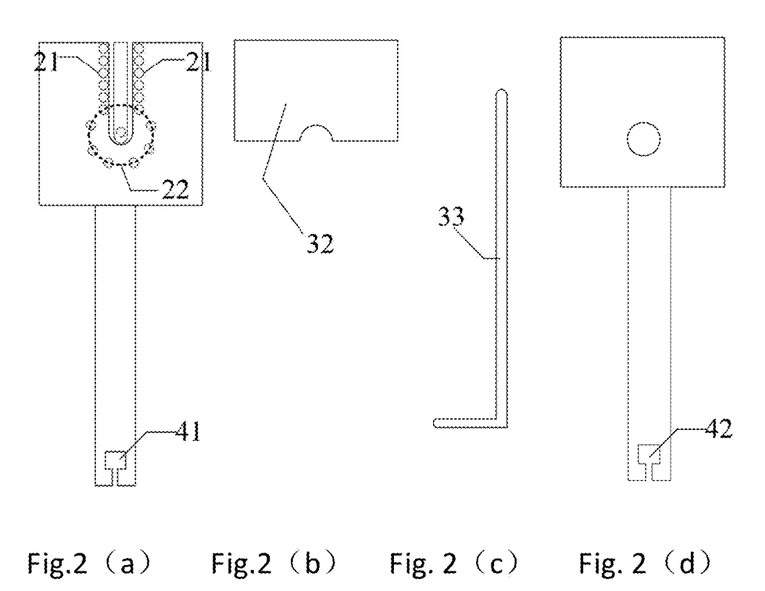
FIG. 2(a) is a top view of a top layer of the wideband near-field magnetic probe.
FIG. 2(b) is a top view of a first middle layer of the wideband near-field magnetic probe.
FIG. 2(c) is a top view of a second middle layer of the wideband near-field magnetic probe.
FIG. 2(d) is a top view of a bottom layer of the wideband near-field magnetic probe.

The present invention is a resonance suppression structure of a wideband near-field magnetic probe, which is based on the wideband near-field magnetic probe. For a better explain of the resonance suppression structure of the present invention, FIG. 1 and FIG. 2(*a*) to (*d*) illustrate the structure of the magnetic probe body of the present invention.

The embodiment of the present invention includes three parts: the CB-CPW resonance and the suppression design thereof; the embodiment of the resonance suppression structure of the magnetic probe; the construction method of the resonance suppression structure of the magnetic probe.

Figure 3:
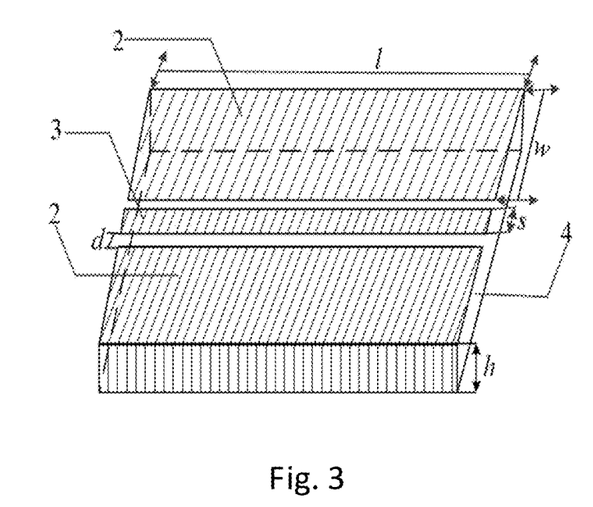
FIG. 3 is a perspective view of a CB-CPW without a fence via-hole array structure.

1. CB-CPW resonance and the suppression design thereof:

FIG. 3 is a perspective view of a CB-CPW without a fence via-hole array structure.

The CB-CPW simulation model illustrated in FIG. 3 is constructed in the CST?microwave studio. The x-axis in the selected coordinate system of the simulation model is along the direction of the long edge of the CB-CPW ground plane; the y-axis is along the direction of the short edge of the ground plane; the z-axis is along the direction of the height of the CB-CPW medium. The CB-CPW medium in the simulation model is set to Rogers4350B; the relative permittivity $\varepsilon_r$ is 3.66; the length of medium is 48 mm; the width is 3.18 mm; the height h is 0.674 mm. The width s of the CB-CPW central conductor 3 is set to 1 mm; the thickness is 0.5 oz. The length l of each ground plane (two pieces which are placed symmetrically on two sides of the CB-CPW central conductor 3) of the CB-CPW is set to 48 mm; the width w is 15 mm; the thickness is 0.05 oz. d is set to 0.4 mm. The length of the back metal panel 4 of the CB-CPW is set to 48 mm; the width is 31.8 mm. The characteristic resistance of the CB-CPW designed is 50Ω.

According to the constructed model, the size of the CB-CPW is substitute into the below formula to calculate the resonance frequency:

$$f_{mn} = 0.5c\sqrt{\frac{1}{\varepsilon_r}\left[\left(\frac{m}{w}\right)^2 + \left(\frac{n}{l}\right)^2\right]}$$

The resonance frequencies get from the above formula are: 1f01=1.63 GHz 2f02=3.26 GHz 3f03=4.90 GHz 4f12=6.16 GHz 5f04=6.53 GHz 6f13=6.53 GHz 7f14=8.36 GHz 8f15=9.69 GHz 9f22, f16=9.69 GHz 10 f17=12.57 GHz.

Figure 4:
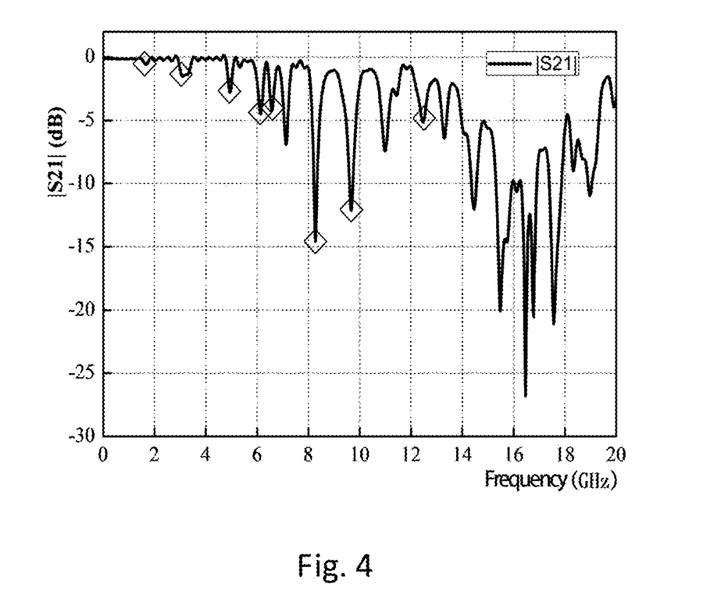
FIG. 4 is a S21 simulation result graph of the CB-CPW in FIG. 1.

A first end of the CB-CPW is defined as conductor Port1 and a second end is defined as conductor Port2. The time-domain algorithm is adopted as the simulation algorithm and the simulation frequency is 0-20 GHz. The conductor port1 and conductor port2 are set to Waveguide port of the same size. The S21 get from the simulation is illustrated as FIG. 4. The calculated resonance frequency is marked on FIG. 4.

Figure 5:
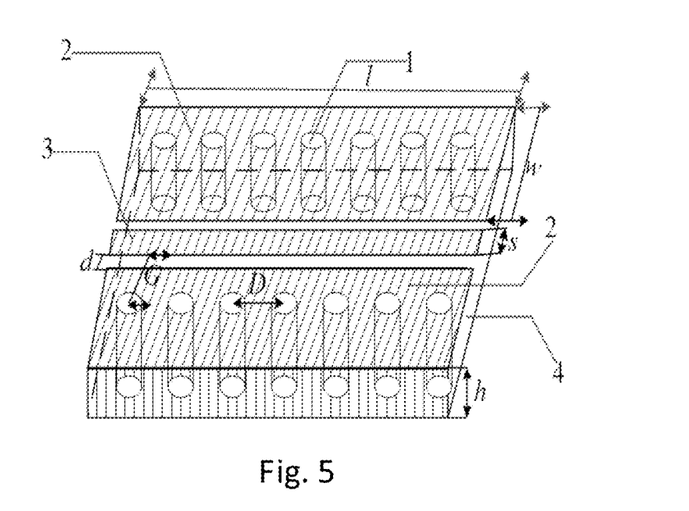
FIG. 5 is a perspective view of a CB-CPW with the fence via-hole array structure.

FIG. 5 is a perspective view of a CB-CPW with the fence via-hole array structure. The ground via holes 1 are connected with the CB-CPW ground plane 2 and the CB-CPW back metal panel 4 respectively. The ground via holes are symmetrically distributed along the two sides of the CB-CPW central conductor 3 and equally spaced. The nearest distances from each of the ground via holes 1 to the edge of the CB-CPW central conductor are equal. The ground via holes 1 surround the CB-CPW central conductor 3 in the middle. The ground via holes 1 form the fence via-hole arrays.

Figure 6:
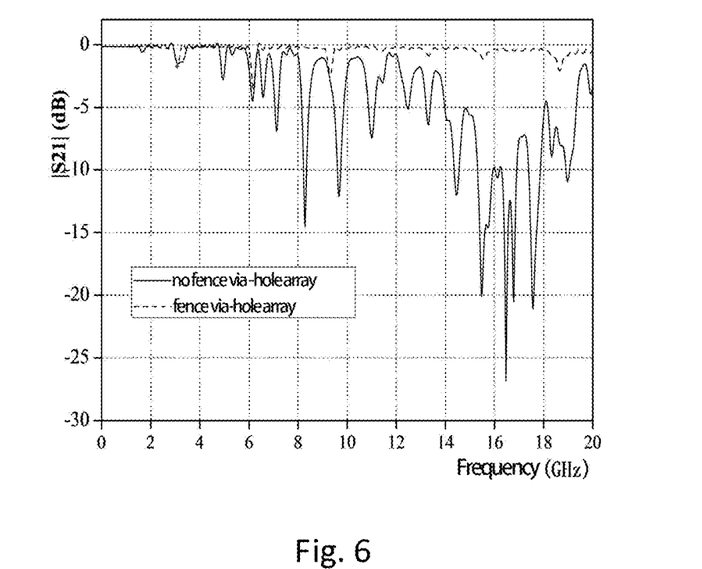
FIG. 6 is a comparison chart of the S21 simulation result of the CB-CPW in FIG. 1 and FIG. 3.

The CST model illustrated in FIG. 5 is constructed based on the constructed CST model illustrated in FIG. 3. Two rows of ground via holes 1 are simulated symmetrically along the two sides of the CB-CPW central conductor 3, which is set to 1.25 m; the radius of the ground via holes 1 is 0.5 mm; the space D between the ground via holes 1 is 2 mm. FIG. 6 is a comparison chart of the re-simulated result S21 and the S21 of the simulation model in FIG. 3. In FIG. 6, the fence through array is proved to be able to effectively suppress the CB-CPW resonance and extends the CB-CPW working band.

Figure 7:
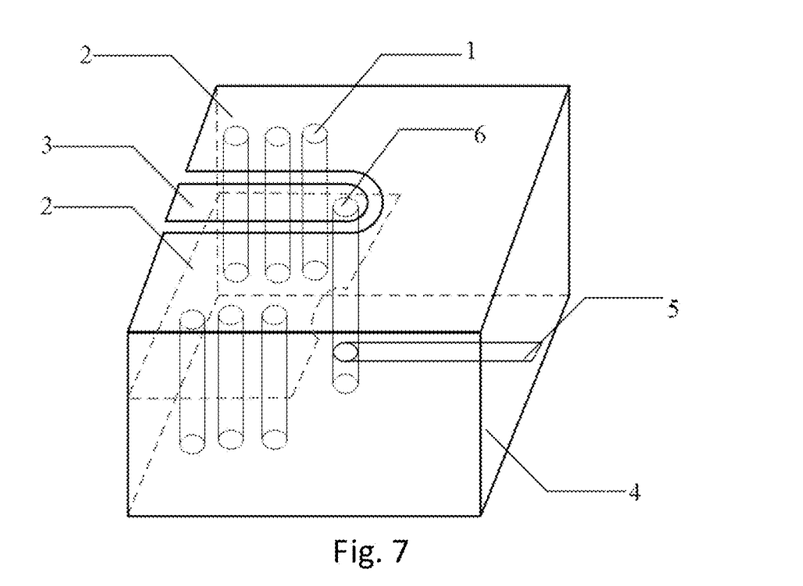
FIG. 7 is a partial enlarged detail of the bottom of the wideband near-field magnetic probe body.
Figure 8:
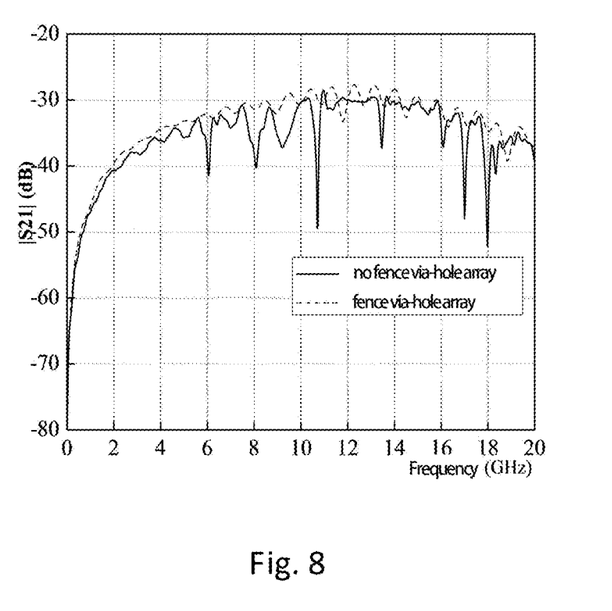
FIG. 8 is a comparison chart of the S21 simulation result of the wideband near-field magnetic probe body with and without the fence via-hole array structure.

2. The embodiment of the resonance suppression structure of the magnetic probe:

FIG. 7 is a partial enlarged detail of the bottom of the wideband near-field magnetic probe body. FIG. 7 comprises the resonance suppression structure of the magnetic probe, wherein two rows of ground via holes 1 are placed symmetrically along the two sides of the CB-CPW central conductor 35; the number of every row of the ground via holes 1 is nine; every row of ground via holes are equally spaced and the space is 0.52 mm; the radius of each of the ground via holes 1 is 0.125 mm; In order to guarantee that each of the ground via holes 1 is able to connect the top shield plane layer 31 of the magnetic probe, the middle plane layer one 32 of the magnetic probe and the bottom shield plane layer 34 of the magnetic probe, every ground via hole is placed out of the rectangle gap at the bottom of the magnetic probe; for a better suppression of the magnetic probe resonance, shortening the horizontal distance between the ground via holes 1 and the edge of the CB-CPW central conductor 35 of the magnetic probe as possible while the processing techniques is capable of (in the present invention the distance is 0.72 m); the ground via holes 1 surround the CB-CPW central conductor 35 of the magnetic probe in the middle and form a fence; the ground via holes 1 form a fence via-hole arrays 21; the fence via-hole arrays 21 provides a signal return path for signals; the ground via holes 1 suppresses a power transmission from a CB-CPW to a parallel-plate-mode, which prevents the parallel-plate-mode incented by the CB-CPW in a working band to move a resonance frequency out of the wording band and improves the working band. FIG. 8 is a comparison chart of the S21 simulation result of the wideband near-field magnetic probe body with and without the fence via-hole array structure. FIG. 8 proves that the resonance suppression method for CB-CPW is able to be effectively adopted by the resonance suppression of the designed magnetic probes, which achieves good result.

3. The construction method of the resonance suppression structure of the magnetic probe.

Figure 9:
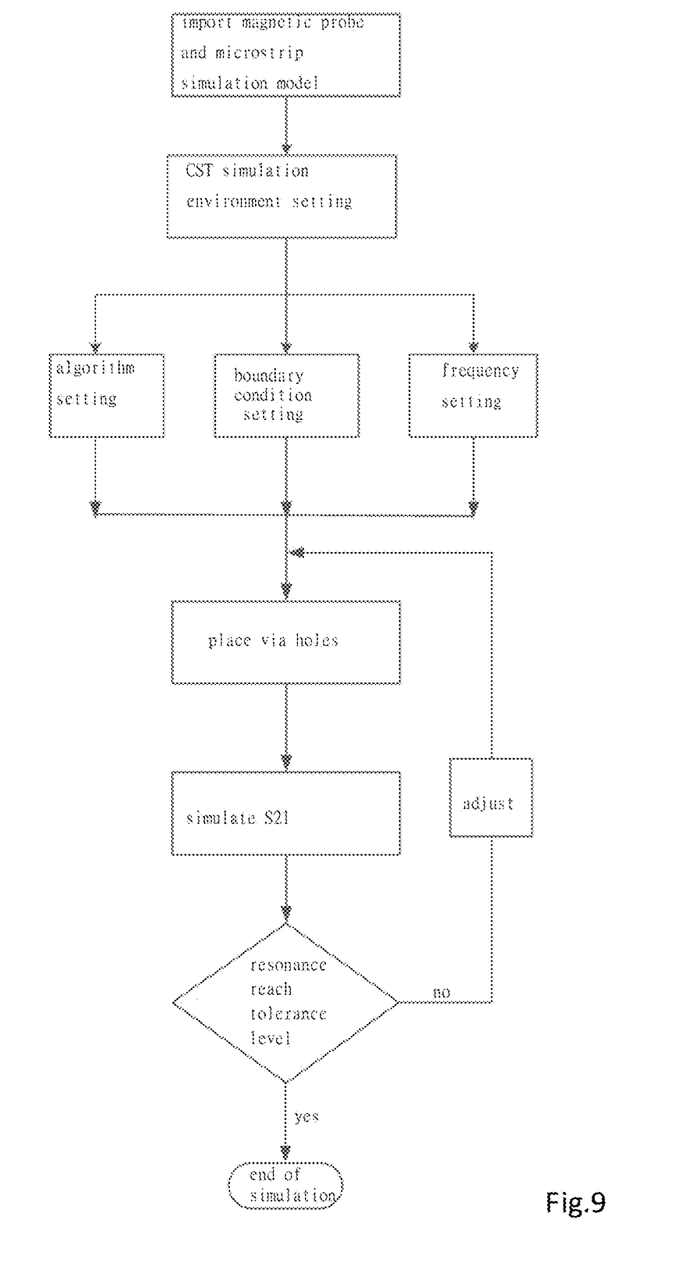
FIG. 9 is a flow chart of the construction method of the resonance suppression structure of the magnetic probe.
Figure 10:
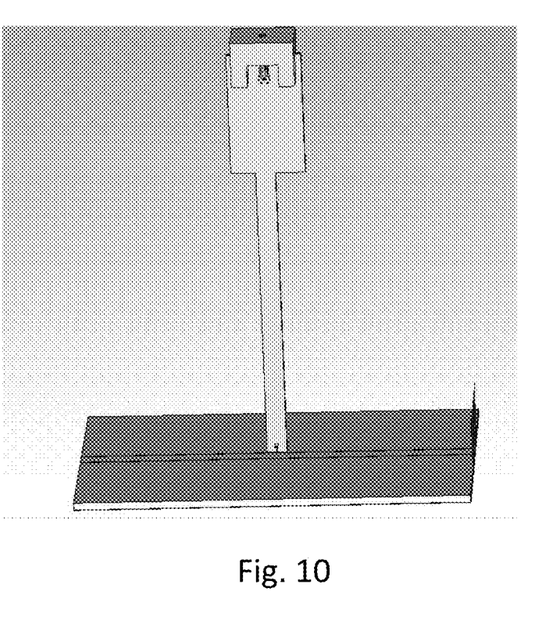
FIG. 10 is a graph of the simulation model formed by the magnetic probe and the microstrip.

FIG. 9 is a flow chart of the construction method of the resonance suppression structure of the magnetic probe. The steps of the construction method f the resonance suppression structure of the magnetic probe are explained in detail as below:

step 1: constructing a simulation model formed by a magnetic probe and a 50Ω microstrip in a CST® microwave studio as illustrated in FIG. 10. The fence via-hole arrays are not included in the magnetic probe body structure; wherein a size of the microstrip substrate is 80 mm×50 mm×1.6 mm; the substrate is made of Rogers4350B; a characteristic resistance of the microstrip is 50Ω;

step 2: setting the time-domain algorithm as the microwave studio algorithm; the simulation background setting is Normal which means the background setting is vacuum and similar to the air in the actual environment; the boundary condition setting is open; although the lower cut-off frequency of the designed magnetic probe is 300 kHz, the simulation is a process which is able to be accelerated with a designed lower cut-off frequency of 0 GHz; the simulation frequency is 0-20 GHz;

step 3: placing ground via holes 1 along two sides of a CB-CPW central conductor 35 at a bottom of the magnetic probe, wherein a radius of the ground via holes is 0.125 mm which is the minimum processing radius of a machine drill; the length of the CB-CPW central conductor of the magnetic probe is 5-8 mm; setting the space between the ground via holes 1 and placing seven ground via holes 1 in each row to prevent the ground via holes 1 from sticking together;

step 4: connecting a 50Ω matching load to a second end of the constructed microstrip and defining the first end as microstrip port1; defining a end of the magnetic probe on which mount a SMA connector as probe port2; simulating S21 parameter; analyzing the resonance of S21 within 300 kHz-20 GHz working band after every simulation; if intolerable resonance exists, adjusting the number of the ground via hole 1 in each row, the space between the ground via holes 1 and the horizontal distance from the ground via holes 1 to the edge of the CB-CPW central conductor 35 of the magnetic probe. In the present invention, when the resonance of S21 of the magnetic probe reaches the tolerance level within the working band 300 kHz-20 GHz, the final number of the ground via holes 1 in each row is 9, the space between the ground via holes 1 is 0.52 mm and the horizontal distance from the ground via holes 1 to the edge of the CB-CPW central conductor 35 of the magnetic probe is 0.72 mm.

The technical means and design method published in the present invention as shown in the drawings and described above is exemplary only and not intended to be limiting. All the solutions derived from the design idea, method, technical means of the present invention, which match the technical features of the present invention, are included. For example, the present invention is able to be applied to CB-CPW microwave circuit and antenna design. Therefore, this invention includes all modifications encompassed within the spirit and scope of the following claims.

What is claimed is:

1. A resonance suppression structure, comprising a magnetic probe, wherein the resonance suppression structure has two rows of vias placed symmetrically along two sides of a CB-CPW (conductor-backed coplanar waveguide) central conductor; each of the two rows of the vias are equally spaced; each of the vias connects a top shield plane layer of the magnetic probe, a first middle layer of the magnetic probe and a bottom shield plane layer of the magnetic probe; each of the vias is placed out of a rectangle gap at a bottom of the magnetic probe; the vias surround the CB-CPW central conductor in a middle and form a fence along the two sides of the CB-CPW central conductor; the vias construct fence via-hole arrays, and the fence via-hole arrays comprise a signal return path.

2. The resonance suppression structure, as recited in claim 1, wherein the magnetic probe comprises a micro coaxial connector and a magnetic probe body;

wherein the micro coaxial connector is a SMA (SubMiniature version A) connector;

the magnetic probe body comprises the top shield plane layer, the bottom shield plane layer, the first middle layer, a stripline of a second middle layer, a via for signal, vias for shorting, a coaxial via-hole array around the via for signal, the CB-CPW central conductor and the fence via-hole arrays along the two sides of the CB-CPW central conductor;

wherein the magnetic probe body is in a T-shape, wherein a narrow end of the T-shape is a top and a wide end is a bottom;

wherein on a top of the top shield plane layer there is a T-shape gap; on a bottom of the top shield plane layer there is a rectangle gap;

wherein on a top of the bottom shield layer there is a T-shape gap of a same size as the T-shape gap at the top of the top shield layer; no opening is on the bottom of the magnetic probe;

wherein the stripline of the second middle layer is in a L-shape; a first end of the stripline is connected with the top shield plane layer and the bottom shield plane layer through the shorting vias at the T-shape gap; the stripline, the T-shape gap on the top shield plane layer and the T-shape gap on the bottom shield plane layer form an internal ring to receive the magnetic signals from outside; the internal ring is wrapped by the top shield plane layer and the bottom shield plane layer;

wherein the CB-CPW central conductor is inside the rectangle gap on the top shield plane layer; the top shield plane layer is treated as a ground plane of the CB-CPW; the first middle layer is treated as a back metal panel of the CB-CPW; the CB-CPW central conductor is treated as a feeder, a second end of which is connected with the SMA connector and a first end is connected with a second end of the stripline through the signal via; the vias symmetrically distributed along the two sides of the CB-CPW central conductor connect the top shield plane layer and the bottom shield plane layer;

wherein the vias around the signal via connect the top shield plane layer and the bottom shield plane layer; distances between each of the vias and the signal via are equal, which are 0.9-1.3 mm;

wherein a length of the CB-CPW central conductor is 5-8 mm; a diameter of the signal via is 0.2-0.3 mm; horizontal distances from the signal via to edges of two sides of the magnetic probe are equal.

3. The resonance suppression structure, as recited in claim 2, wherein a diameter of the vias is 0.2 mm-0.3 mm; a diameter of the shorting vias is 0.2 mm-0.3 mm; a wideband is 300 kHz-20 GHz; a size of the magnetic probe is Φ50 mm×10 mm-Φ90 mm×20 mm.

* * * * *